United States Patent

Kurahashi et al.

[11] Patent Number: 5,971,289
[45] Date of Patent: Oct. 26, 1999

[54] APPARATUS AND METHOD FOR AIR-CONDITIONING A VEHICLE

[75] Inventors: Yasufumi Kurahashi, Otsu; Minoru Fukumoto, Nara, both of Japan

[73] Assignee: Matsushita Electric Industrial Co., Ltd., Osaka-fu, Japan

[21] Appl. No.: 08/942,296

[22] Filed: Oct. 1, 1997

[30] Foreign Application Priority Data

Oct. 2, 1996 [JP] Japan .................................. 8-261646

[51] Int. Cl.⁶ ................................................ G05D 23/00
[52] U.S. Cl. ........................................ 237/2 B; 237/814
[58] Field of Search ...................... 237/2 B, 8 A, 237/28

[56] References Cited

U.S. PATENT DOCUMENTS

| | | | |
|---|---|---|---|
| 4,024,722 | 5/1977 | Mccarty | 62/81 |
| 4,178,988 | 12/1979 | Cann et al. | 165/2 |
| 4,311,190 | 1/1982 | Walley | 165/25 |
| 4,550,770 | 11/1985 | Nussdorfer et al. | 165/29 |
| 4,627,483 | 12/1986 | Harshbarger, III et al. | 165/2 |
| 4,852,360 | 8/1989 | Harshbarger, Jr. et al. | 62/126 |
| 4,943,003 | 7/1990 | Shimizu et al. | 237/2 B |
| 5,259,445 | 11/1993 | Pratt et al. | 165/12 |
| 5,501,267 | 3/1996 | Iritani et al. | 165/29 |
| 5,692,390 | 12/1997 | Karl et al. | 237/2 B |

FOREIGN PATENT DOCUMENTS

| | | | |
|---|---|---|---|
| 5-346257 | 12/1993 | Japan | 237/2 B |
| 6-262934 | 9/1994 | Japan | 237/2 B |

Primary Examiner—Henry Bennett
Assistant Examiner—Derek S. Boles
Attorney, Agent, or Firm—Wenderoth, Lind & Ponack, L.L.P.

[57] ABSTRACT

An automotive air conditioning apparatus includes a forced water supply system 12 and a heat pump system 14. The temperature of the vehicle interior is controlled by the heat pump system under ordinary atmospheric temperature conditions. However, at very low temperatures, for example, at the temperature of −5° C. or lower, the temperature of the vehicle interior is controlled by the forced water supply system. According to this air conditioning arrangement, it is possible to achieve energy-efficient air conditioning even under very low temperature conditions and to prevent any compressor damage due to the liquefaction of the refrigerant.

26 Claims, 2 Drawing Sheets

APPARATUS AND METHOD FOR AIR-CONDITIONING A VEHICLE

FIELD OF THE INVENTION

The invention relates to an air conditioning apparatus and method for conditioning the temperature of the interior of an automotive vehicle. More particularly, the invention relates to an automotive air conditioning apparatus and method wherein a forced water supply system and a heat pump system are utilized for air conditioning purposes.

BACKGROUND OF THE INVENTION

Japanese Patent Laid-Open Application No. 8-20226 discloses an automotive air conditioning apparatus. This air conditioning apparatus includes a heat pump system which heats the air by utilizing the heat generated when a compressible refrigerant is compressed, and a forced water supply system which heats the air by utilizing heated water.

In such an air conditioning apparatus, the heat pump system is only operated when the outside air temperature is higher than a specified temperature. If the outside air temperature is lower than the specified temperature, the heat pump system is not operated alone, but the forced water supply system is complementarily operated in conjunction with the heat pump system to prompt the rate of heating.

However, in a very low-temperature environment, i.e., about −5° C. or lower, the refrigerant of the heat pump system is unable to receive sufficient heat from the outside air. Therefore, the air conditioning apparatus could not exhibit good heating performance corresponding to the electric power consumption. This results in poor heating efficiency. In the case of electric motor cars in particular, if any part of the electric power accumulated in the battery is consumed for air conditioning purposes, the distance which the car can run is correspondingly reduced. Therefore, the development of an air conditioning apparatus which can exhibit particularly good power efficiency has been desired.

Futhermore, in the heat pump system, another problem is that the refrigerant in an uncompressed state will become liquefied under very low temperature conditions. When the liquefied refrigerant is fed to the compression chamber of the compressor, the compressor may be damaged with the result that the heat pump system will become inoperative.

SUMMARY OF THE INVENTION

The object of this invention is to provide an automotive air conditioning apparatus which will not cause any unreasonable load and/or damage to the compressor of the heat pump system during operation under very low temperature conditions and is operable by low electric power, and a method for such air conditioning.

Therefore, the automotive air conditioning apparatus in accordance with the invention comprises a first heating means having a heat pump system, a second heating means having a forced water supply heating system, and a temperature sensing means for detecting the temperature of atmospheric air. In this air conditioning apparatus, when the air temperature detected by the temperature sensing means is lower than a specified temperature (e.g., −5° C.), operation of the first heating means is stopped and the second heating means is operated to condition the air of the vehicle interior. If the detected air temperature is higher than the specified temperature (e.g., −5° C.), the first heating means is operated to condition the air of the vehicle interior, and the operation of the second heating means is stopped. According to the above described air conditioning apparatus, and method for such air conditioning, it is possible to provide good energy-efficient air conditioning under very low temperature conditions and to prevent the compressor from being damaged due to liquefaction of the refrigerant.

DETAILED DESCRIPTION OF THE PREFERRED EMBODIMENTS

Figure 1:
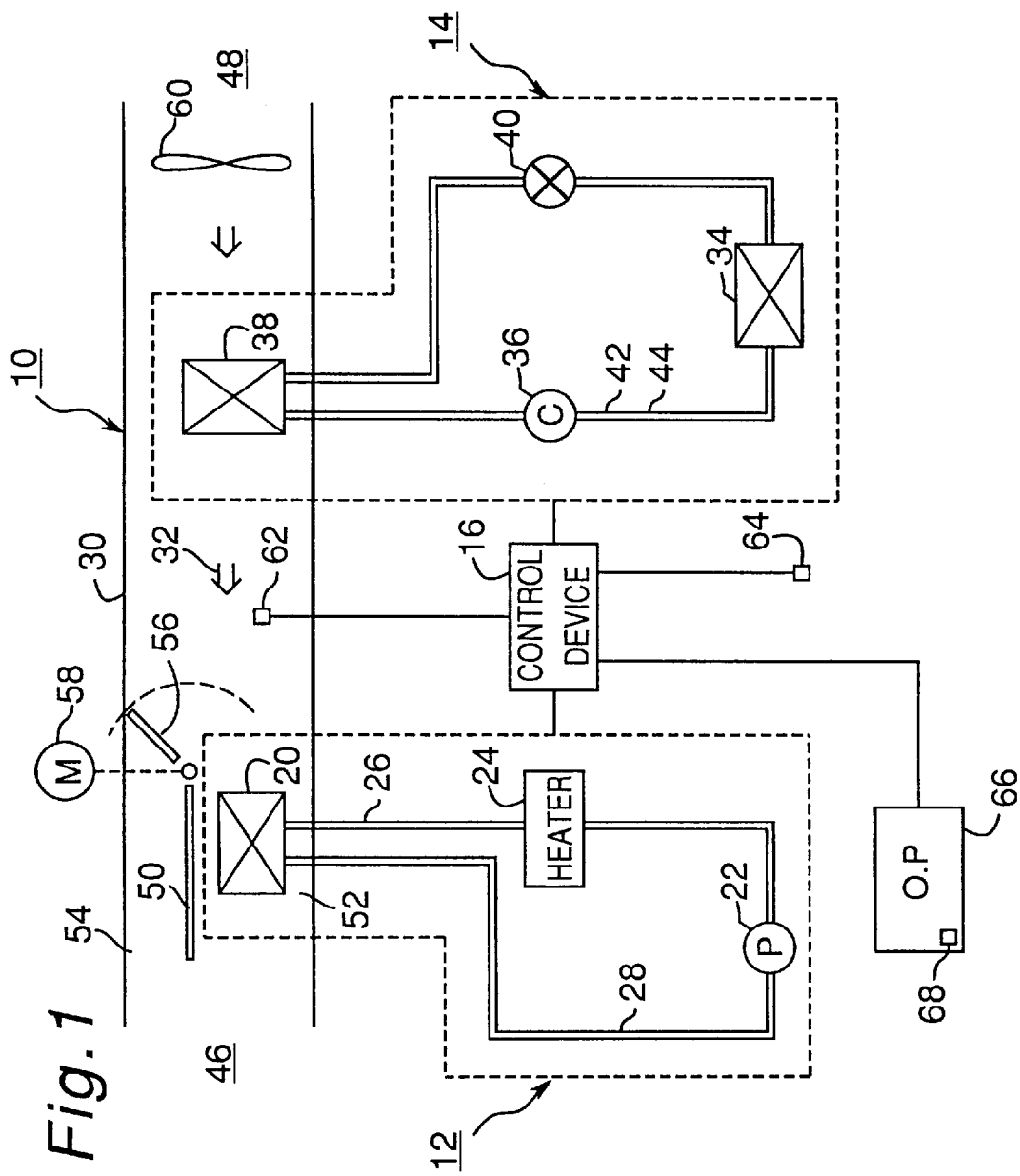
FIG. 1 is a block diagram showing general arrangement of the air conditioning apparatus according to the present invention.

One preferred embodiment of the automotive air conditioning apparatus in accordance with the invention will now be described with reference to the accompanying drawings. FIG. 1 is a block diagram showing both the mechanical arrangement and the electrical arrangement of the air conditioning apparatus. The air conditioning apparatus shown generally by reference numeral 10 includes a forced water supply heating system (shown generally by reference numeral 12) for heating the vehicle interior utilizing the heat of heated medium, and a heat pump system (shown generally by reference numeral 14) for heating the vehicle interior utilizing the heat generated when the refrigerant is compressed, and a control device 16 for controlling these heating means.

The forced water supply system 12 includes a heat exchanger (a third heat exchanger) 20, a pump 22, a heater 24, and a circulating pipe 26 which connects these devices in series in the order of mention, with water 28 housed as a heating medium in the circulating pipe 26. The heat exchanger 20 is disposed within an air conditioning duct 30.

In the forced water supply system 12, water 28 is caused to circulate through the heat exchanger 20 and the heater 24 via the circulating pipe 26 in accordance with the actuation of the pump 22. In the course of circulation of the water 28, the water 28 is heated at the heater 24 and the heat of the water 28 thus heated is transferred at the heat exchanger 20 to the air 32 flowing in the air conditioning duct 30. The water 28 which has been deprived of heat is heated again at the heater 24. Although water is used as a heating medium in the present embodiment, heating mediums usable in the invention are not limited to water only, but include other heating mediums (such as engine cooling liquid or radiator liquid).

The heat pump system 14 includes a first heat exchanger 38, an expansion valve 40, a second heat exchanger 34, a compressor 36, and a circulating pipe 42 which connects these devices in series in the order of mention, with a refrigerant 44 (e.g., HFC-134a) housed in the circulating pipe 42. The heat exchanger 38 is disposed in the air conditioning duct 30, and the heat exchanger 34 is disposed outside the vehicle interior.

In the heat pump system 14, the refrigerant 44 at the heat exchanger 34 absorbs heat from the air. Then, the refrigerant 44 is compressed by the compressor 36 to a high pressure corresponding to a high temperature and, at the heat exchanger 38, the compressed refrigerant imparts heat to the air 32 flowing in the air conditioning duct 30. In turn, the refrigerant 44 which has been deprived of heat is decompressed and expanded at the expansion valve 40 to a low pressure corresponding to a low temperature. Then, the cooled refrigerant 44 is sent to the heat exchanger 34.

The duct 30 is connected at one end thereof to a vehicle interior 46, the other end of the duct 20 being open to the atmosphere 48. The heat exchanger 20 of the forced water supply system 12 is disposed closer to the vehicle interior 46 than the heat exchanger 38 of the heat pump system 14. At one side of the third heat exchanger 20 there is disposed a partition wall 50 extending longitudinally of the duct 30 to define a first passageway 52 in which is housed the heat exchanger 20 and a second passageway 54 located opposite to the first passageway 52 with the partition wall 50 positioned therebetween. A mix damper 56 comprised of a plate material is pivotally mounted at one end of the partition wall 50 on the upstream side of the flow of air 32. The mix damper 56 is connected to a motor 58 so as to be pivotable in response to the actuation of the motor 58, so that the mix damper 56 can adjust the degree of opening of the first passageway 52 or second passageway 54 thereby regulating the quantity of air coming in contact with the heat exchanger 20. Additionally, in the duct 30 on the upstream side of the heat exchanger 38 relative to the direction of flow of air 32 there is provided a fan 60 such that air 32 from the atmosphere is introduced into the duct 30 through the rotation of the fan 60. After contact with the first heat exchanger 38 the air 32 contacts the third heat exchanger 20 in the first passageway 52 before being fed into the vehicle interior 46.

Generally, for the heat exchangers 20, 34, and 38, heat exchangers of the parallel flow type, serpentine type, and the fin and tube type can be advantageously employed.

Connected to the control device 16 are a temperature sensor 62 for sensing the temperature of the air 32 flowing in the duct 30, and a temperature sensor 64 for sensing the temperature of outside air. The control device 16 is also connected to an air conditioning operator panel 66, forced water supply system 12, and heat pump system 14. The control device 16 controls the forced water supply system 12, heat pump system 14, and the position of the mix damper 56 on the basis of the user preset values. The user preset values are the control conditions input at the air conditioning operator panel 66, and with reference to the detection data from the temperature sensors 62 and 64.

Figure 2:
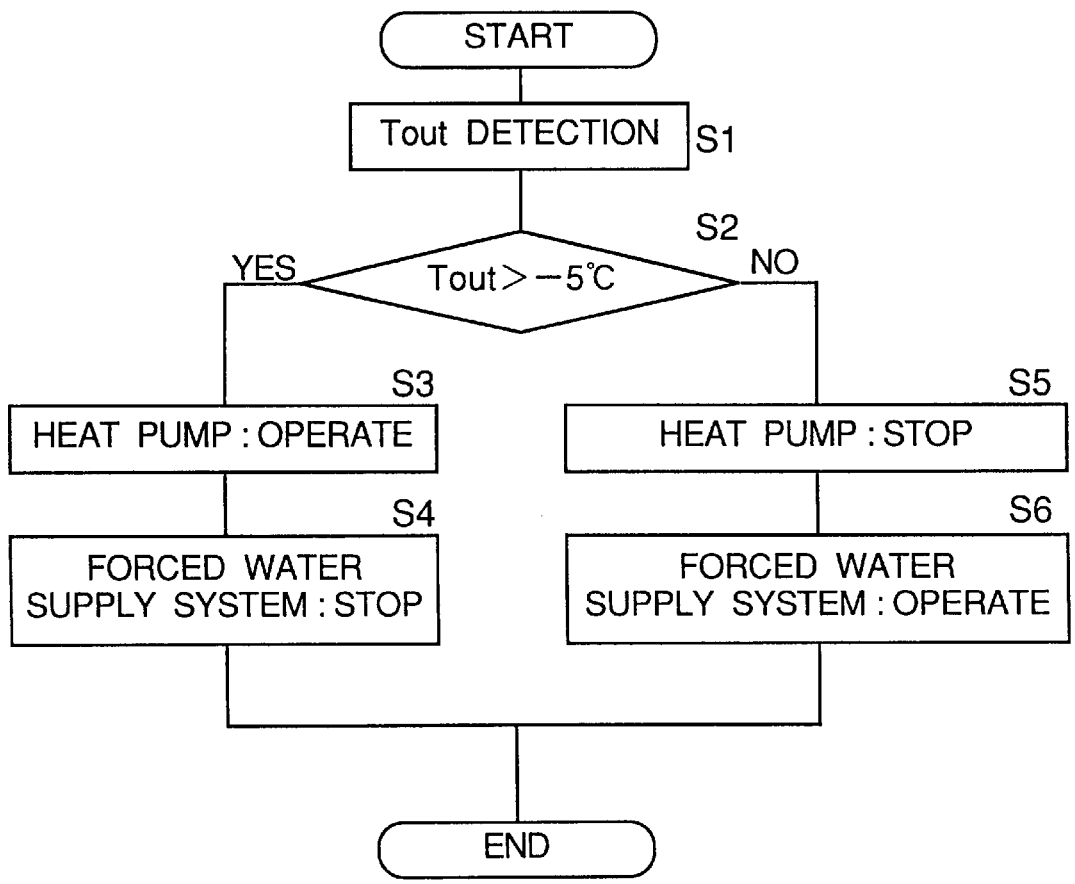
FIG. 2 is a flow chart showing a control program for the air conditioning apparatus.

FIG. 2 shows a flow chart of a control program incorporated into the control device 16. The control program is executed for each predetermined cycle time where a drive switch 68 on the air conditioning operator panel 66 is at the ON position. Specifically, during a heating operation, the temperature sensor 62 detects outside temperature Tout (S1). The detected outside temperature Tout is compared with a preset specified temperature (e.g., −5° C.) (S2). When the outside temperature Tout is higher than the specified temperature, the heat pump system 14 is operated (S3). At this point of time, the forced water supply system 12 is in a stop status (S4). When the detected outside air temperature is lower than the preset specified temperature, operation of the heat pump system 14 is stopped (S5), and the forced water supply system 12 is operated alone (S6).

In the above described embodiment of the air conditioning apparatus of the invention, the apparatus is provided so that during a heating operation under very low temperature conditions, the heat pump system 14 is held in a non-operating state because, under such temperature conditions, it operates with poor efficiency and involves the danger of being damaged. In this case the forced water supply system 12 is operated alone. Under ordinary temperature conditions of more than the specified temperature, the heat pump system 14 is operated alone with good efficiency. Therefore, the embodiment enables generally efficient heating operation and protection of the compressor 36 of the heat pump system 14.

In the foregoing description, the heater 24 of the forced water supply system 12 is not limited to a resistance heater, but may include a heating element such as positive temperature coefficient thermistor or ceramic heater.

While the invention has been described in its preferred form, it is to be understood that various modifications and changes may be made without departing from the scope of the invention, and that all details included in such description or shown in the accompanying drawings are for illustrative purposes only and should not be construed in any restrictive sense.

The disclosure herein relates to the particulars included in Japanese Patent Application (Serial No.8-261646) filed Oct. 2, 1996, which are incorporated herein by reference.

What is claimed is:

1. An apparatus comprising:

an automotive vehicle having a vehicle interior and a vehicle exterior;

said automotive vehicle including a heat pump system, a forced water supply heating system, a temperature sensor for detecting the temperature of atmospheric air, and an air conditioner controller;

wherein said temperature sensor is positioned at said vehicle exterior such that said temperature sensor detects the temperature of atmospheric air; and wherein said air conditioner controller is connected to said forced water supply heating system, said heat pump system, and said temperature sensor such that when the temperature of atmospheric air detected by said temperature sensor is below a specified temperature, said air conditioner controller stops operation of said heat pump system and actuates said forced water supply heating system.

2. The apparatus of claim 1, wherein said automotive vehicle is an electric motor car.

3. The apparatus of claim 1, wherein the specified temperature is −5° C.

4. The apparatus of claim 1, further comprising:

a duct having a first end communicating with said vehicle interior and a second end at said vehicle exterior;

a blower positioned such that it moves air through said duct from said vehicle exterior to said vehicle interior;

wherein said heat pump system includes a compressor for compressing a first medium, a first heat exchanger positioned in said duct for transferring heat from the first medium to air in said duct, a pressure reducing valve for decompressing the first medium, and a second heat exchanger for transferring heat from the atmospheric air to the first medium; and wherein said forced water supply heating system includes a heater for heating a second heat transfer medium, a third heat exchanger positioned in said duct for transferring heat from the second medium to air in said duct, and a pump for moving the second medium through said third heat exchanger and said heater.

5. The apparatus of claim 4, wherein said heat pump system further includes a circulating pipe connecting said compressor, said first heat exchanger, said pressure reducing valve, and said second heat exchanger, in sequence.

6. The apparatus of claim 4, wherein said forced water supply heating system further includes a circulating pipe connecting said heater, said third heat exchanger, and said pump.

7. The apparatus of claim 4, wherein said duct includes a partition wall, said partition wall extending within said duct in the longitudinal direction such that said partition wall forms a first passageway and a second passageway within said duct; said third heat exchanger being positioned in said first passageway; said duct further including a valve positioned at an end of said partition wall such that said valve regulates a flow of air through said first passageway and said second passageway.

8. The apparatus of claim 4, further comprising a first medium, wherein said first medium comprises HFC-134a.

9. The apparatus of claim 4, further comprising a second heat transfer medium, wherein said second heat transfer medium comprises water.

10. The apparatus of claim 4, wherein said heater comprises a resistance heater.

11. The apparatus of claim 4, wherein said heater comprises a ceramic heater.

12. The apparatus of claim 4, wherein said heater comprises a positive temperature coefficient thermistor.

13. An apparatus comprising:
a heat pump system;
a forced water supply heating system;
a temperature sensor positioned such that said temperature sensor detects the temperature of atmospheric air;
an air conditioner controller;
wherein said air conditioner controller is connected to said forced water supply heating system, said heat pump system, and said temperature sensor such that when the temperature of atmospheric air detected by said temperature sensor is below a specified temperature, said air conditioner controller stops operation of said heat pump system and actuates said forced water supply heating system;
a duct having a first end and a second end, said second end being open to atmospheric air;
a blower positioned such that it moves air through said duct from said second end to said first end;
wherein said heat pump system includes a compressor for compressing a first medium, a first heat exchanger positioned in said duct for transferring heat from the first medium to air in said duct, a pressure reducing valve for decompressing the first medium, and a second heat exchanger for transferring heat from the atmospheric air to the first medium;
wherein said forced water supply heating system includes a heater for heating a second heat transfer medium, a third heat exchanger positioned in said duct for transferring heat from the second medium to air in said duct, and a pump for moving the second medium through said third heat exchanger and said heater.

14. The apparatus of claim 13, further comprising an automotive vehicle having a vehicle interior, wherein said first end of said duct communicates with said vehicle interior.

15. The apparatus of claim 14, wherein said automotive vehicle comprises an electric motor car.

16. The apparatus of claim 13, wherein the specified temperature is −5° C.

17. The apparatus of claim 13, wherein said heat pump system further includes a circulating pipe connecting said compressor, said first heat exchanger, said pressure reducing valve, and said second heat exchanger, in sequence.

18. The apparatus of claim 13, wherein said forced water supply heating system further includes a circulating pipe connecting said heater, said third heat exchanger, and said pump.

19. The apparatus of claim 13, wherein said duct includes a partition wall, said partition wall extending within said duct in the longitudinal direction such that said partition wall forms a first passageway and a second passageway within said duct; said duct further including a valve positioned at one end of said partition wall such that said valve regulates a flow of air through said first passageway and said second passageway; wherein said third heat exchanger is positioned in said first passageway.

20. The apparatus of claim 13, further comprising a first medium, wherein said first medium comprises HFC-134a.

21. The apparatus of claim 13, further comprising a second heat transfer medium, wherein said second heat transfer medium comprises water.

22. The apparatus of claim 13, wherein said heater comprises a resistance heater.

23. The apparatus of claim 13, wherein said heater comprises a ceramic heater.

24. The apparatus of claim 13, wherein said heater comprises a positive temperature coefficient thermistor.

25. A method of air conditioning, comprising:
providing an automotive vehicle having a vehicle interior and a vehicle exterior;
wherein said automotive vehicle is provided such that said automotive vehicle includes a temperature sensor, a forced water supply heating system, a heat pump system, and an air conditioner controller;
positioning said temperature sensor at said vehicle exterior such that said temperature sensor detects the temperature of atmospheric air;
connecting said air conditioner controller to said forced water supply heating system, said heat pump system, and said temperature sensor such that when the temperature of the atmospheric air detected by said temperature sensor is above a specified temperature, said air conditioner controller actuates said heat pump system and stops operation of said forced water supply heating system, and when the temperature of the atmospheric air detected by said temperature sensor is below a specified temperature, said air conditioner controller actuates said forced water supply heating system and stops operation of said heat pump system.

26. The method of claim 25, further comprising:
providing a duct having a first end connected to said vehicle interior and a second end at said vehicle exterior;
providing a blower positioned such that it moves air through said duct from said vehicle exterior to said vehicle interior;
providing a first heat exchanger of said heat pump system such that said first heat exchanger is positioned within said duct for transferring heat to air in said duct;
providing a third heat exchanger of said forced water supply heating system such that said third heat exchanger is positioned within said duct for transferring heat to air in said duct;
providing a partition wall within said duct such that said partition wall is positioned in the longitudinal direction of said duct, said partition wall forming a first passageway and a second passageway within said duct, said third heat exchanger being positioned in said first passageway;
providing a valve within said duct such that said valve is positioned at an end of said partition wall;
controlling said valve such that a flow of air through said first passageway and said second passageway is regulated.

* * * * *